United States Patent
Zhang et al.

(10) Patent No.: US 9,678,265 B2
(45) Date of Patent: Jun. 13, 2017

(54) LIGHT GUIDE PLATE AND BACKLIGHT MODULE AND DISPLAY DEVICE APPLYING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Caizheng Zhang, Beijing (CN); Jingshi Li, Beijing (CN); Hyungkyu Kim, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 229 days.

(21) Appl. No.: 14/386,957

(22) PCT Filed: Nov. 28, 2013

(86) PCT No.: PCT/CN2013/088003
§ 371 (c)(1),
(2) Date: Sep. 22, 2014

(87) PCT Pub. No.: WO2014/201806
PCT Pub. Date: Dec. 24, 2014

(65) Prior Publication Data
US 2016/0282536 A1      Sep. 29, 2016

(30) Foreign Application Priority Data
Jun. 21, 2013   (CN) .......................... 2013 1 0250217

(51) Int. Cl.
*F21V 8/00*        (2006.01)

(52) U.S. Cl.
CPC ........... *G02B 6/0021* (2013.01); *G02B 6/009* (2013.01); *G02B 6/0068* (2013.01); *G02B 6/0073* (2013.01); *G02B 6/0091* (2013.01)

(58) Field of Classification Search
CPC .... G02B 6/0021; G02B 6/009; G02B 6/0066; G02B 6/0091; G02B 6/0073
See application file for complete search history.

(56) References Cited

U.S. PATENT DOCUMENTS 5,876,107 A * 3/1999 Parker .................. G02B 6/0018
362/231
6,474,826 B1 * 11/2002 Tanaka .................. G02B 6/0018
362/23.16
(Continued)

FOREIGN PATENT DOCUMENTS

| CN | 2888479 Y | 4/2007 |
| CN | 101354492 A | 1/2009 |

(Continued)

OTHER PUBLICATIONS

International Preliminary Report on Patentability Appln. No. PCT/CN2013/088003; Dated Dec. 22, 2015.
(Continued)

*Primary Examiner* — Julie Bannan
(74) *Attorney, Agent, or Firm* — Ladas & Parry LLP

(57) ABSTRACT

A light guide plate, a backlight module and a display device employing the same. The light guide plate is configured to guide light emitted from an LED lamp on an LED lamp strip, and a light incident surface of a side portion of the light guide plate is provided with an indentation; when the LED lamp is locked in the indentation, a light emitting center line of the LED lamp coincides a light incident center line of the (Continued)

light guide plate. The backlight module includes a light guide plate, and the display device includes the above backlight module.

6 Claims, 3 Drawing Sheets

(56) References Cited

U.S. PATENT DOCUMENTS

| | | | | |
|---|---|---|---|---|
| 2004/0151006 A1* | 8/2004 | Yang | G02B 6/0021 | 362/558 |
| 2006/0114693 A1* | 6/2006 | Chou | G02B 6/003 | 362/631 |
| 2006/0146569 A1* | 7/2006 | Huang | G02B 6/0021 | 362/612 |
| 2006/0158901 A1* | 7/2006 | Wang | G02B 6/0021 | 362/612 |
| 2007/0127261 A1* | 6/2007 | An | G02B 6/0016 | 362/608 |
| 2008/0002428 A1* | 1/2008 | Byun | G02B 6/0016 | 362/608 |
| 2008/0049168 A1* | 2/2008 | Kubota | G02B 6/0021 | 349/65 |
| 2010/0290247 A1* | 11/2010 | Im | G02B 6/0091 | 362/606 |
| 2011/0069512 A1* | 3/2011 | Horst | G02B 6/0021 | 362/613 |
| 2012/0051090 A1* | 3/2012 | Lin | G02B 6/0021 | 362/615 |
| 2013/0016309 A1* | 1/2013 | Wang | G02B 6/0078 | 349/62 |
| 2013/0021822 A1* | 1/2013 | Wimmer | G02B 6/005 | 362/612 |
| 2013/0051069 A1* | 2/2013 | Moon | G02F 1/133615 | 362/608 |
| 2013/0336002 A1* | 12/2013 | Huang | G02B 6/0021 | 362/608 |
| 2014/0085930 A1 | 3/2014 | Hua et al. | | |
| 2014/0218970 A1 | 8/2014 | Wu et al. | | |

FOREIGN PATENT DOCUMENTS

| | | |
|---|---|---|
| CN | 101936486 A | 1/2011 |
| CN | 201866625 U | 6/2011 |
| CN | 202521499 U | 11/2012 |
| CN | 102818187 A | 12/2012 |

OTHER PUBLICATIONS

Fourth Chinese Office Action dated Apr. 13, 2016; Appln. No. 201310250217.3.
Second Chinese Office Action Appln. No. 201310250217.3; Dated Apr. 21, 2015.
International Search Report Appln. No. PCT/CN2013/088003; Dated Mar. 27, 2014.
First Chinese Office Action Appln. No. 201310250217.3; Dated Oct. 29, 2014.
Third Chinese Office Action dated Oct. 13, 2015; Appln. No. 201310250217.3.

* cited by examiner

LIGHT GUIDE PLATE AND BACKLIGHT MODULE AND DISPLAY DEVICE APPLYING THE SAME

TECHNICAL FIELD

Embodiments of the present invention relate to a light guide plate, and a backlight module and a display device employing the same.

BACKGROUND

A light guide plate is a significant component of a side incident backlight module and used to transform a linear light source to a planar light source.

FIG. 1 is a partial cross-sectional view of an existing backlight module, and the backlight module mainly comprises: a reflective film 11, a light guide plate 12, a diffusing film 13, a lens film 14, a lamp strip 15 and a back plate 16; the LED lamp strip 15 comprises a printed circuit board (PCB) 151 and a plurality of LED (Light-Emitting Diode) lamps 152 welded on the PCB 151; a light emitting surface of the LED lamp 152 is opposite to a light incident surface 121 of a side portion of the light guide plate 12, so as to allow the light emitted from the LED lamp 152 to enter the light guide plate 12 from the light incident surface 121, and the light will emit from the light emitting surface 122 of the top portion of the light guide plate 12 after refracted or reflected in the light guide plate 12. The diffusing film 13 and the lens film 14 are used to converge the light emitted from the light emitting surface to an intended range of viewing angle.

In assembling the above backlight module, as illustrated by FIG. 1, it is needed to bond the LED lamp strip 15 onto the back plate 16 via a lamp strip fixing tape 17 at first, then lock the light guide plate 12 to a bayonet of the back plate 16, so as to enable the light emitting surface of the LED lamp 152 to be opposite to light incident surface 121 of the side portion of the light guide plate 12. Because the installation of the LED lamp strip 15 and the installation of the light guide plate 12 are separated, it is hard to guarantee the light emitting surface of the LED lamp 152 be totally right-opposite to the light incident surface of the light guide plate 12 (i.e., as illustrated by the imaginary line in FIG. 1, the center line 153 of the light emitting surface of the LED lamp 152 coincide the center line 123 of the light incident surface of the light guide plate 12). When the light emitting surface of the LED lamp 152 and the light incident surface of the light guide plate 12 can not be totally right-opposite, it is easy for hot dot phenomenon to appear on the light emitting surface 121 of the light guide plate 12, as illustrated by FIG. 2, the solid lines with arrows represent the transmitting routes of the light emitted from the LED lamp 152.

SUMMARY

Embodiments of the present invention provide a light guide plate, and a backlight module and a display device employing the same, which can solve the problem that it is hard to guarantee a light emitting center line of the LED lamp to precisely coincide a light incident center line of the light guide plate in existing backlight modules.

An embodiment according to the present invention provides a light guide plate, configured to guide light emitted from an LED lamp on an LED light strip; the light incident surface of a side portion of the light guide plate is provided with an indentation, so that when the LED lamp is locked in the indentation, a light emitting center line of the LED lamp and a light incident center line of the light guide plate coincide with each other.

Preferably, a shape of the indentation is a reverse taper.

Or, preferably, the shape of the indentation is a shape matching the shape of the LED lamp.

In some embodiments, a light incident surface of a side portion of the light guide plate is provided with indentations, the indentations have a same shape and are distributed at a same interval, and the centers of the bottoms of the indentations are located on one horizontal line.

On another aspect, an embodiment according to the present invention provides a backlight module, which comprises an LED lamp strip; the backlight module further comprises the above light guide plate, the LED lamp on the LED lamp strip is locked in the indentation of the light incident surface of the side portion of the light guide plate.

Furthermore, when the LED lamp is locked in the indentation, the printed circuit board on the LED lamp strip is firmly connected on the light incident surface of the top of the indentation.

Preferably, the printed circuit board is firmly connected on the light incident surface of the top of the indentation via an adhesive.

Furthermore, the light emitting surface of the LED lamp and the light incident surface of the bottom of the indentation have an interval therebetween.

In another aspect, an embodiment according to the present invention provides a display device, which comprises a display panel and the above backlight module.

BRIEF DESCRIPTION OF THE DRAWINGS

In order to clearly illustrate the technical solutions in the embodiments of the invention or the prior arts, the drawings needed in the embodiments or the descriptions of the prior arts will be briefly described in the following; it is obvious that the drawings in the following description are only related to some embodiments of the invention, for those skilled in the art, they can obtain the other drawings according to these drawings without paying any inventive work.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
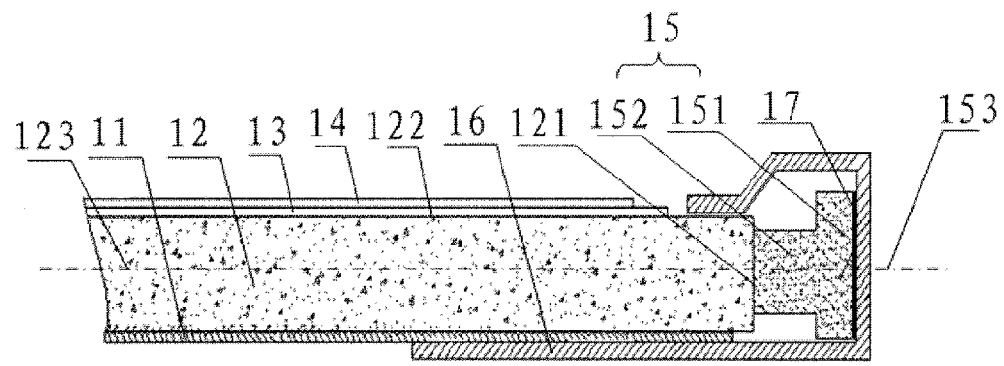
FIG. 1 is a partial cross-sectional view of an existing backlight module.
Figure 2:
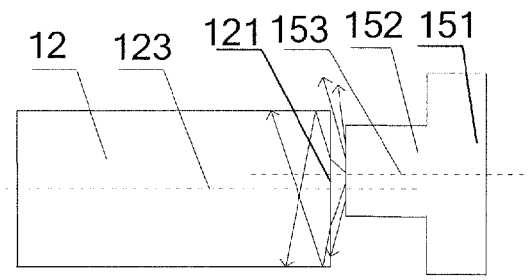
FIG. 2 is a partial cross-sectional view of a light guide plate and an LED lamp strip in the backlight module as illustrated by FIG. 1.
Figure 3:
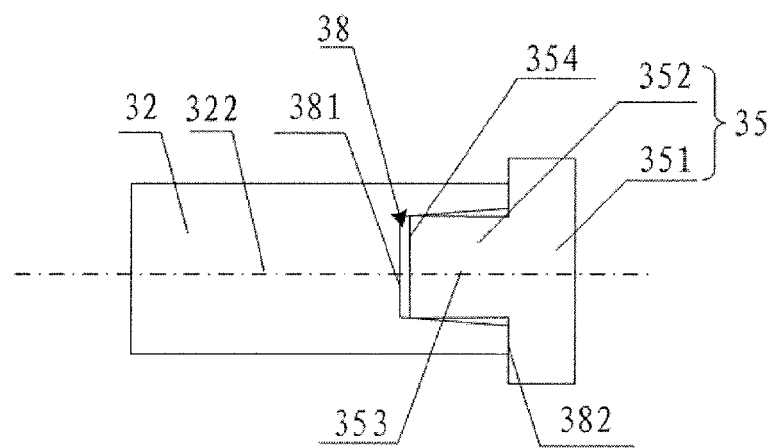
FIG. 3 is a partial cross-sectional view of a light guide plate installed with an LED lamp strip and provided by an embodiment of the present invention.

An embodiment of the present invention provides a light guide plate 32, as illustrated by FIG. 3, which is used to guide light emitted from an LED lamp 352 on an LED lamp strip 35; a light incident surface 381 of a side portion of the light guide plate 32 is provided with an indentation (recess) 38, so that, when the LED lamp 352 is held in the indentation 38, a light emitting center line 353 of the LED lamp 352 and a light incident center line 322 of the light guide plate 32 are in accordance. The light guide plate 32 comprises a first surface 391 and a second surface 392 opposite to the first surface 391. The indentation 38 comprises a first top portion 3821 adjacent to the first surface, a second top portion 3822 adjacent to the second surface, and a bottom 3823 between the first and second top portions (3821 and 3822, respectively). The indentation 38 further comprises a first side wall 3825 extending from the first top portion 3821 to the bottom 3823 and a second side wall 3826 extending from the second top portion 3822 to the bottom 3823. As shown, the LED lamp is in contact with the first and second side walls when the LED lamp is locked in the indentation.

Firstly, the light emitting center line of the LED lamp and the light incident center line of the light guide plate are explained. The LED lamp, as a light emitting unit, is used to provide light needed by a backlight source. Due to the influences of those factors such as the characteristics of LED and the shape of the back plate, light emitting regions of different LED lamps are different with each other. In order to determine the light emitting region of the LED lamp, the light emitting center line of the LED lamp is defined as: the light emitting center line is a line segment located at the center of the light emitting region of the LED lamp; the light emitting center line is used to mark the light emitting region of the LED lamp, so as to further understood the light emitting conditions of the LED lamp. In the same way, the light incident surface of the light guide plate is used to receive incident light, thus the line segment of the center of the light incident region of the light guide plate is defined as a light incident center line; the light incident center line is used to mark the region of the light incident surface of the light guide plate.

The work principle of a light guide plate is to utilize net-points on its bottom to interrupt the interference phenomenon of light, so as to evenly transform a point light source or a linear light source to a plane light source, with functions in guiding the scattering directions of light, improving the brightness of the liquid crystal panel and guaranteeing the evenness of the brightness of the liquid crystal panel. It should be noted that the design of the distribution of the net-points on the bottom of the light guide plate is under the condition that the light emitting center line of the LED lamp and the light incident center line of the light guide plate coincide with each other, if the light emitting center line of the LED lamp and the light incident center line of the light guide plate do not coincide with each other, the light emitted from the LED can not be reflected or refracted in the light guide plate according to the preset light routes, which may lead to the situations such as uneven distribution of light and the increase of the total reflection within the light guide plate, causing the uneven brightness of the liquid crystal panel and hot dots and reducing the whole brightness of the liquid crystal panel.

In the light guide plate 32 provided by an embodiment of the present invention, because an indentation 38 is disposed, and when the LED lamp 352 is locked in the indentation 38, the light emitting center line 353 can coincide the light incident center line 322 of the light guide plate 32 together, which reduces the difficulty in matching the two center lines. Besides, the above-mentioned hot dot phenomenon can be alleviated or avoided when the two center lines are concurrent with each other.

Furthermore, in the light guide plate 32 provided by the above embodiment, because light can transmit according to the preset light routes, which reduces the unnecessary loss during the transmitting procedure of light, thus the defect of the decrease in the brightness of the liquid crystal panel caused by the non-coincidence between the light emitting center line 353 of the LED lamp 352 and the light incident center line 322 of the light guide plate 32 is avoided.

In the light guide plate 32 provided by the above embodiment, the shape of the indentation 38 may be a reverse taper. This shape is designed based on the shape of the conventional LED lamp 352 in the existing liquid crystal displays; because the cross-section at the opening portion of the reverse taper is bigger than that at the bottom, when an LED lamp 352 is installed in the indentation 38, the LED lamp 352 can be easily placed into the indentation 38, so as to facilitate the installation of the LED lamp 352. And the shape of a reverse taper has a function of self-correction, which makes the light emitting center line 353 of the LED lamp 352 coincide the light incident line 322 of the light guide plate 32.

In the light guide plate 32 provided by the above embodiment, the shape of the indentation 38 may be a shape matching the shape of the LED lamp 352. The configuration can not only make the LED lamp 352 be easily and firmly locked in the indentation 38, but also increase the compactness between the light guide plate 32 and the LED lamp 352, so as to reduce the amount of the light leakage caused by the existence of a gap between the light guide plate 32 and the LED lamp 352. For example, dependent on different shapes for the LED lamp 352, the matching shapes for the indentation 38 can be a circular column shape, a semicircular globular shape, or other conventional shapes of indentations.

It should be noted that the shapes of the above indentation 38 are not limited to a reverse taper shape or the shapes matching the shapes for the LED lamp 352, any shapes that can make the LED lamp 352 be locked in the indentation 38 can be used in the present invention. What should be understood by those skilled in the art is that a reverse taper or a shape matching the shape of the LED lamp 352 for the shape of the indentation 38 is a preferable example but not a unique example of the light guide plate according to the embodiment of the present invention.

Figure 7:
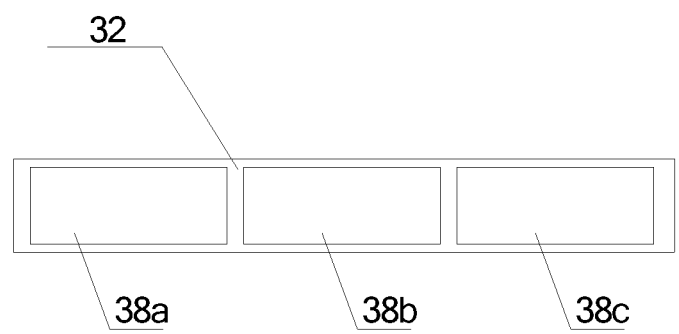
FIG. 7 is a schematic diagram of a light guide plate having a plurality of indentations.

Moreover, it also should be noted that because an LED lamp may comprise a plurality of LED light emitting units, in order to make every LED light emitting unit match the light incident center line of the light guide plate, another example of the light guide plate of the embodiment of the present invention is provided here: the light incident surface of the side portion of the light guide plate is provided with indentations (e.g., indentations 38a, 38b, 38c as shown in FIG. 7), the indentations have the same shapes and are distributed at a same interval, and the centers of the bottom of the indentations are located on one horizontal line.

In the light guide plate of an embodiment of the present invention, because of the provision of an indentation, when the LED lamp is locked in the indentation, the light emitting center line of the LED lamp can coincide the light incident center line of the light guide plate together, thus it can be realized by locking the LED lamp in the indentation that the light emitting center line of the LED lamp coincides the light incident center line, which reduces the difficulty in matching the two center lines. Further, the hot dot phenomenon can be avoided when the two center lines are concurrent with each other.

Figure 6:
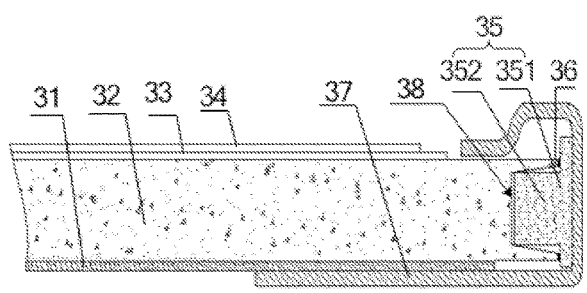
FIG. 6 is a partial cross-sectional view of a backlight module provided by an embodiment of the present invention.

In another aspect, an embodiment of the present invention provides a backlight module, as illustrated in FIG. 6, which comprises a reflective film 31, a diffusing film 33, a lens film 34, an LED lamp strip 35 and a back plate 37. The backlight module further comprises a light guide plate 32 as described by the above embodiment; an LED lamp 352 on the LED lamp strip 35 is locked in an indentation 38 of the light incident surface of a side portion of the light guide plate 32. The functions of the reflective film 31, the diffusing film 33 and the lens film 34 are the same as the corresponding components in the existing backlight module, which will not be described in detail here.

Figure 4:
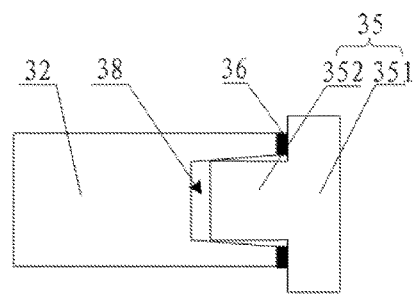
FIG. 4 is a schematic diagram of a connection type of the light guide plate and the LED lamp strip.
Figure 5:
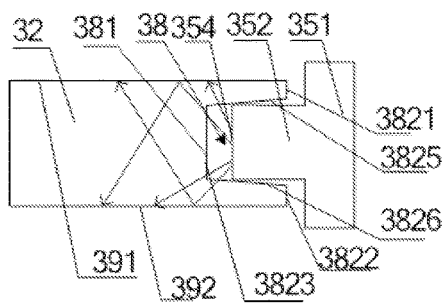
FIG. 5 is a schematic diagram of another connection type of the light guide plate and the LED lamp strip.

As illustrated by FIG. 4, FIG. 5 and FIG. 6, in the light guide plate 32 of the backlight module of the embodiment of the present invention, when the LED lamp 352 is locked in the indentation 38, the first and second top portions (3821 and 3822) of the indentation 38 and a printed circuit board 351 on the LED lamp strip 35 can be fixed onto the light incident surface of the first and second top portions (3821 and 3822) of the indentation 38. It should be noted that, as seen in FIG. 4, the indentation is disposed on the light incident surface of the side portion of the light guide plate and recessed towards the inner side of the light guide plate, thus the side portion region except the indentation 38 is called the first and second top portions (3821 and 3822) of the indentation 38. It is beneficial to improve of the stability of the LED lamp 352 in the indentation 38 to connect the first and second top portions (3821 and 3822) of the indentation 38 of the light guide plate and the printed circuit board 351 on the LED lamp strip 35 together. If the size of the shape of the LED lamp 352 is small, and the size of the shape of the indentation 38 is big, then it can ensure the LED light 352 to be more firmly locked in the indentation 38 by fixing the first and second top portions (3821 and 3822) of the indentation 38 and the printed circuit board 351 on the LED lamp strip 35.

It should be noted that: in the embodiments of the present invention, the method to lock the LED lamp 352 in the indentation is not limited to the way that the first and second top portion (3821 and 3822) of the indentation 38 and the printed circuit board 351 on the LED lamp strip 35 are fixed and aligned as illustrated by FIG. 4, FIG. 5 and FIG. 6, it is also feasible in designing a proper indentation shape to lock the LED lamp 352 with the surface of the indentation 38 when the LED lamp 352 is inserted into the indentation 38, or other methods known by those skilled in the art. When the LED lamp 352 is locked in the indentation 38, the printed circuit board 351 and the first and second top portions (3821 and 3822) of the indentation 38 may be closely attached as illustrated by FIG. 3 and FIG. 4 and FIG. 6 and also may have a certain interval as illustrated by FIG. 5.

Furthermore, in a backlight module provided by an embodiment of the present invention, as illustrate by FIG. 4, the top portion of the indentation in the light guide plate 32 may be firmly connected with the printed circuit board 351 via an adhesive 36. The printed circuit board 351 is formed from a polyimide or polyester sheet as a base material, the light guide plate 32 is formed of an optical grade acrylic plate. In view of the materials of the two and in order to assemble conveniently and improve the stability of the connection, the embodiment of the present invention preferably adopts an adhesive to bond the printed circuit board 351 and the light guide plate 32 together. Certainly, the embodiment of the present invention also may adopts a double-sided tape or other bonding material to firmly connect the printed circuit board to the light incident surface of the top portion of the indentation, which will not be described in detail here.

It should be further noted is that the light guide plate may be formed by stamping or injection; and the step of forming an indentation on the light incident surface of the light guide plate may be accomplished during the procedure of preparing the light guide plate, also may be accomplished in the succeeding steps of the light guide plate by etching and cutting.

Furthermore, in a backlight module provided by an embodiment of the present invention, as illustrate by FIG. 5, the light emitting surface 354 of the LED lamp 352 in the light guide plate 32 and the light incident surface 381 of the bottom of the indentation may have an interval therebetween. It is found in practice that it is not that the closer the distance between the LED lamp 352 and the light guide plate 32 is, the better effect is; if the distance is too closer, it may cause the light at the side close to the LED lamp 352 of the light guide plate too strong, which is not good for the evenness of the emitting light, but if the distance is too far, it may causes unnecessary optical energy loss. Therefore, the distance between the light guide plate 32 and the LED lamp 352 can be determined according to the factors such as net-point distribution on the bottom of the light guide plate 32 and the shape and size of the LED lamp 352, and the proper distance will improve the performances such as the brightness of the liquid crystal panel and the evenness of the display.

Meanwhile, as illustrate by FIGS. 3-5, because the light emitting surface of the LED lamp 352 is totally contained in the indentation 38 of the light guide plate 32, which makes the light emitting surface 354 of the LED lamp 352 be surrounded by the light guide plate 32, light emitted from the light emitting surface 354 of the LED lamp is totally enclosed within the light guide plate 32; however, in the existing backlight modules, because the light emitting surface of the LED lamp is not surrounded by the light guide plate, the problem of light leakage exists; the embodiments of the present invention can solve the problem, so as to reduce the optical loss and improve the utilizing ratio of light efficiently. The solid lines with arrows in FIG. 5 are the routes of the light emitting from the LED lamp 352.

In the backlight module provided by the embodiments of the present invention, because the light guide plate 32 described by the above embodiment is used, the backlight module has the advantages such as even brightness, high utilizing ratio of optical energy, high brightness, and stable mechanical performance.

Besides, in assembling the backlight module provided by the embodiments of the present invention, firstly, the LED lamp 352 on the LED lamp strip 35 is locked in the indentation 38 of the light guide plate 32, and the adhesive 36 in the FIG. 6 can be used to ensure that the light guide plate 32 and the LED lamp strip 35 are fixed, which guarantees the alignment of the LED lamp 352 and the light guide plate 32, then the light guide plate 32 provided with the LED lamp strip 35 is inserted in the back plate 37. Because the back plate 37 and the LED lamp strip 35 do not need a lamp strip fixing tape to bond them together, the problem of yield decrease of the backlight module caused by the dislocation bonding of the LED lamp strip and the back plate in the existing backlight module is avoided, meanwhile, the assembling efficiency of the backlight module is improved.

An embodiment of the present invention further provides a display device, which comprises a display panel and the above backlight module.

What are described above are only the specific embodiments of the present invention, and not limitative to the protection scope of the present invention, any variation or replacement which can be easily envisaged by those skilled in the art who know the present technical field should fall in the protection scope of the present invention. Therefore, the protection scope of the present invention shall be subject to the protection scope of the claims.

The invention claimed is:

1. A backlight module, comprising a light guide plate and an LED lamp strip, wherein the light guide plate is configured to guide light emitted from an LED lamp of the LED lamp strip, the light guide plate comprises a first surface and a second surface opposite to the first surface, and a light incident surface provided at a side portion of the light guide plate and extending between the first and the second surfaces, the first surface is a light emitting surface of the light guide plate, the light incident surface of the light guide plate is provided with at least one indentation having a tapered shape, the at least one indentation is provided with a first top portion adjacent to the first surface, a second top portion adjacent to the second surface, a bottom between the first and second top portions, a first side wall extending from the first top portion to the bottom and a second side wall extending from the second top portion to the bottom, the LED lamp is configured to be locked in the at least one indentation with the LED lamp in contact with the first and second side walls, such that a light emitting center line of the LED lamp coincides with a light incident center line of the light guide plate, wherein a shape of the at least one indentation is a shape matching a shape of the LED lamp.

2. The backlight module according to claim 1, wherein the light incident surface of the side portion of the light guide plate, a plurality of the indentations having a same shape and distributed at a same interval, and centers of the indentations are located on one horizontal line.

3. The backlight module according to claim 1, wherein when the LED lamp is locked in the indentation, a printed circuit board on the LED lamp strip is firmly connected onto a light incident surface of a top of the indentation.

4. The backlight module according to claim 3, wherein the printed circuit board is firmly connected onto the light incident surface of the top of the indentation by an adhesive.

5. The backlight module according to claim 3, wherein a light emitting surface of the LED lamp and the light incident surface of the bottom of the indentation have an interval therebetween.

6. A display device comprising a display panel and the backlight module as claimed by claim 1.

* * * * *